（12）United States Patent
Wakayama et al.

(10) Patent No.: US 8,503,118 B2
(45) Date of Patent: Aug. 6, 2013

(54) LENS DRIVING DEVICE

(75) Inventors: Tomihiro Wakayama, Saitama (JP); Takatoshi Kanemura, Kawasaki (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 13/215,095

(22) Filed: Aug. 22, 2011

(65) Prior Publication Data
US 2012/0050893 A1 Mar. 1, 2012

(30) Foreign Application Priority Data
Aug. 31, 2010 (JP) ................................ 2010-194654

(51) Int. Cl.
G02B 15/14 (2006.01)
G02B 7/02 (2006.01)

(52) U.S. Cl.
USPC ........... 359/823; 359/696; 359/811; 359/822; 359/824

(58) Field of Classification Search
USPC .................................. 359/811, 815, 822–824
See application file for complete search history.

(56) References Cited

U.S. PATENT DOCUMENTS
7,782,548 B2 * 8/2010 Yumiki et al. ................ 359/698
8,072,869 B2 * 12/2011 Hosoda et al. ........... 369/112.23

FOREIGN PATENT DOCUMENTS
JP 2005-315935 11/2005

* cited by examiner

Primary Examiner — Mahidere Sahle
(74) Attorney, Agent, or Firm — Beyer Law Group LLP

(57) ABSTRACT

In a lens driving device, a rack gear portion is used as a gear portion so that the gear portion can be disengaged from the terminal end of the lead screw in the radial direction. To efficiently utilize a guide shaft formed with high precision, the guide shaft extends through a spring supporting frame of a lens holder that holds a lens, a movable member having the rack gear portion that meshes with the lead screw, whereby the movable member and the lens holder are linearly guided along the guide shaft, and the guide shaft also serves as the rotation axis of the movable member. A compression coil spring is wound around the guide shaft, and the rack gear portion is pressed against the lead screw by using the compression coil spring.

8 Claims, 13 Drawing Sheets

LENS DRIVING DEVICE

CROSS REFERENCE TO RELATED APPLICATIONS

The present application claims the benefit of 35 U.S.C. §119 or 35 U.S.C. §365 under 37 C.F.R. §1.55 based on priority to Japanese Patent Application No. 2010-194654, filed Aug. 31, 2010, which is hereby incorporated herein by reference in its entirety.

BACKGROUND OF THE INVENTION

1. Field of the Invention

The present invention relates to a lens driving device that is mounted in an optical unit (for example, a camera unit of a mobile terminal or an optical pickup mechanism of an optical disc drive) and that is used to focus a lens and to correct spherical aberration of the lens.

2. Description of the Related Art

Japanese Unexamined Patent Application Publication No. 2005-315935 describes an existing technology in this field. According to this Publication, a lens driving device includes a lens holding frame to which a lens is fixed. The lens holding frame includes a first shaft supporting portion and a second shaft supporting portion. A first shaft, which extends through the first shaft supporting portion, prevents rotation of the lens holding frame. A second shaft, which extends through the second shaft supporting portion, enables the lens holding frame to be linearly guided with high precision. A first rack, which rotates around a shaft portion, is attached to the second shaft supporting portion. A rack gear portion, which is formed at an end of the first rack, meshes with a lead screw. The rack gear portion is urged against the lead screw by a torsion coil spring that is wound around the shaft portion. A compression coil spring is wound around a part of the shaft portion between the first rack and a second rack. The compression coil spring urges the rack gear portion in a direction opposite to the second rack along the lead screw, thereby preventing backlash of the rack gear portion.

However, the lens driving device described above has a problem in that the device has a complex structure and a large size, because the device is structured such that the lens holding frame and the rack are rotatably connected to each other through the shaft portion that extends parallel to the second shaft, which is used to guide the lens holding frame with high precision.

SUMMARY OF THE INVENTION

An object of the present invention is to provide a lens driving device having a simple structure and a small size.

According to the present invention, a lens driving device mounted in an optical unit includes a lead screw rotated by a motor; a movable member including a gear portion that is a rack gear portion or a half nut portion that meshes with the lead screw; a lens holder that reciprocates along a rotation axis of the lead screw as the lead screw rotates; a guide shaft that extends parallel to the rotation axis, the guide shaft extending through and guiding the movable member and a spring supporting frame of the lens holder; and a coil spring that is wound around the guide shaft and disposed in the spring supporting frame. The coil spring has a first end held by the lens holder and a second end held by the movable member, and the coil spring presses the gear portion against the lead screw with an urging force thereof applied to the gear portion through the second end.

In the lens driving device, the rack gear portion or the half nut portion is used as the gear portion that meshes with the lead screw. When, for example, an ordinary female threaded nut is used as the gear portion, if the motor becomes uncontrollable for some reason and the lead screw continues rotating, the lead screw may bite into the female threaded nut at the terminal end of the lead screw and thereby the nut or the lead screw may be completely broken. Moreover, it is necessary that the threads of the lead screw and the female threaded nut be formed with high precision for the purpose of noise reduction. To solve such problems, the rack gear portion or the half nut portion is used as the gear portion in the present invention. To efficiently utilize the guide shaft formed with high precision, the guide shaft extends through the spring supporting frame of the lens holder that holds the lens, the movable member including the gear portion that is the rack gear portion or the half nut portion that meshes with the lead screw, whereby the movable member and the lens holder are linearly guided along the guide shaft, and the guide shaft can be also used as the rotation shaft of the movable member. The coil spring is wound around the guide shaft, and the gear portion is pressed against the lead screw by using the coil spring. With such a structure, the lead screw and the guide shaft can be disposed close to each other when the rack gear portion or the half nut portion is used as the gear portion, and thereby the size of the lens driving device is reduced.

It is preferable that the guide shaft extend through a first portion of the spring supporting frame, a second portion of the spring supporting frame facing the first portion, and the movable member; the movable member be disposed between the first portion and the second portion, and the movable member be in contact with the first portion; the coil spring be a compression coil spring; and the compression coil spring be disposed in the spring supporting frame at a position between the movable member and the second portion, the first end of the compression coil spring be held by the spring supporting frame, and the second end of the compression coil spring be held by the movable member.

With such a structure, because the movable member is always in contact with the spring supporting frame of the lens holder, the lens holder can be smoothly moved. Moreover, an advantage is obtained in that the structure of the lens driving device can be simplified by reducing the number of springs.

It is preferable that the lens driving device further include an anti-rotation shaft that extends parallel to the guide shaft; and the lens holder include an anti-rotation piece that protrudes perpendicular to the rotation axis of the lead screw, and the anti-rotation piece be pressed against the anti-rotation shaft by the urging force of the compression coil spring applied to the anti-rotation piece through the first end of the compression coil spring that is held by the spring supporting frame.

With such a structure, rotation of the lens holder can be prevented by using the compression coil spring, which serves to press the gear portion against the lead screw and to press the movable member against the spring supporting frame. Moreover, the lens driving device can be assembled easily because it is sufficient that the anti-rotation piece be simply brought into contact with the anti-rotation shaft.

With the present invention, it is possible to simplify the structure and reduce the size of a lens driving device.

DESCRIPTION OF THE PREFERRED EMBODIMENTS

DESCRIPTION OF THE PREFERRED EMBODIMENTS

Hereinafter, a lens driving device according to embodiments of the present invention will be described in detail with reference to the drawings.

It is necessary for an optical pickup mechanism (optical unit) of an optical disc drive to focus a light beam on a data layer of an optical disc with high precision. Therefore, it is necessary for a high-precision optical pickup mechanism to finely move a lens in the optical axis direction so that the mechanism can correct spherical aberration that occurs due to non-uniformity in the thickness of a cover layer of an optical disc.

Figure 1:
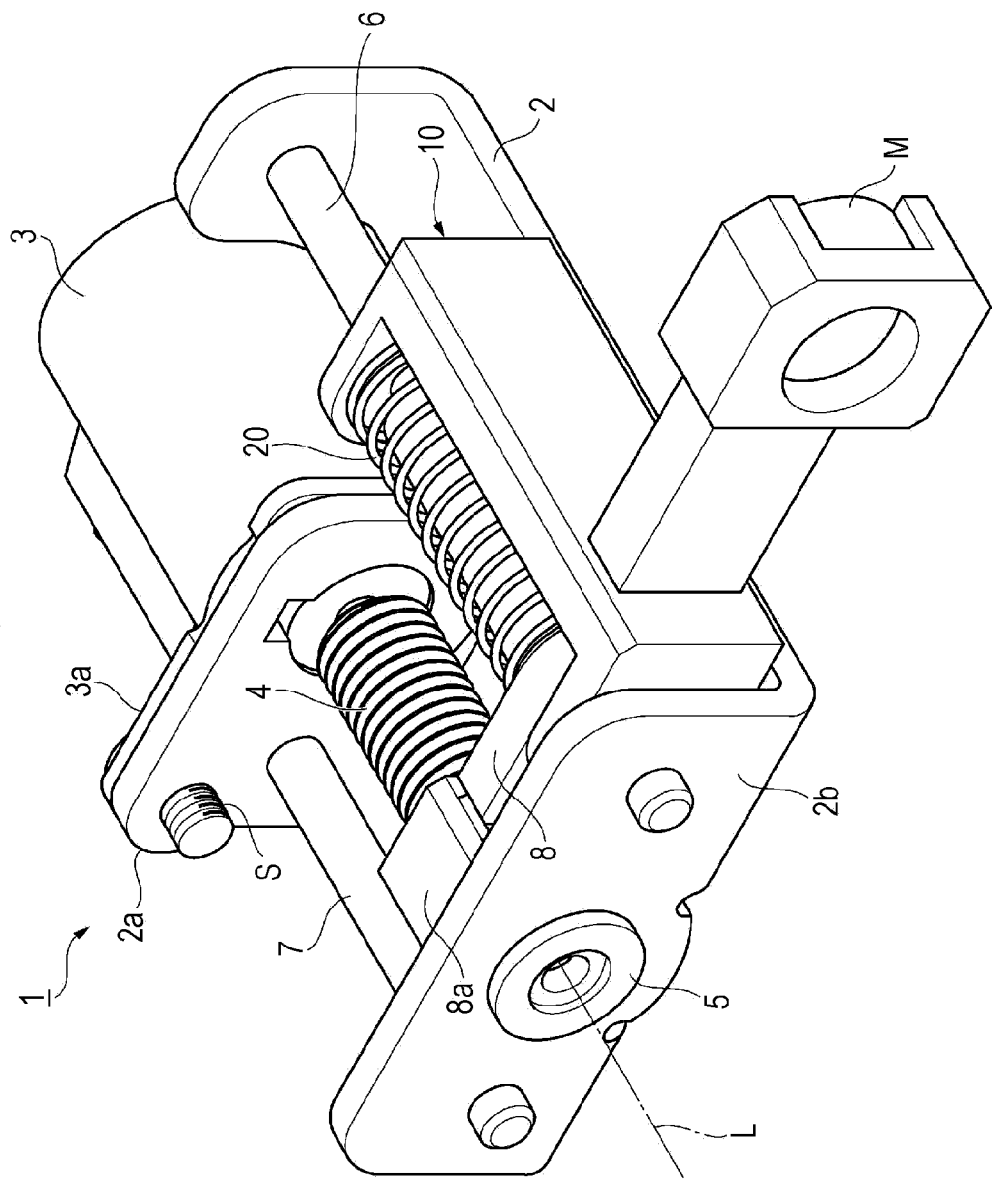
FIG. 1 is a perspective view of a lens driving device according to an embodiment of the present invention.
Figure 2:
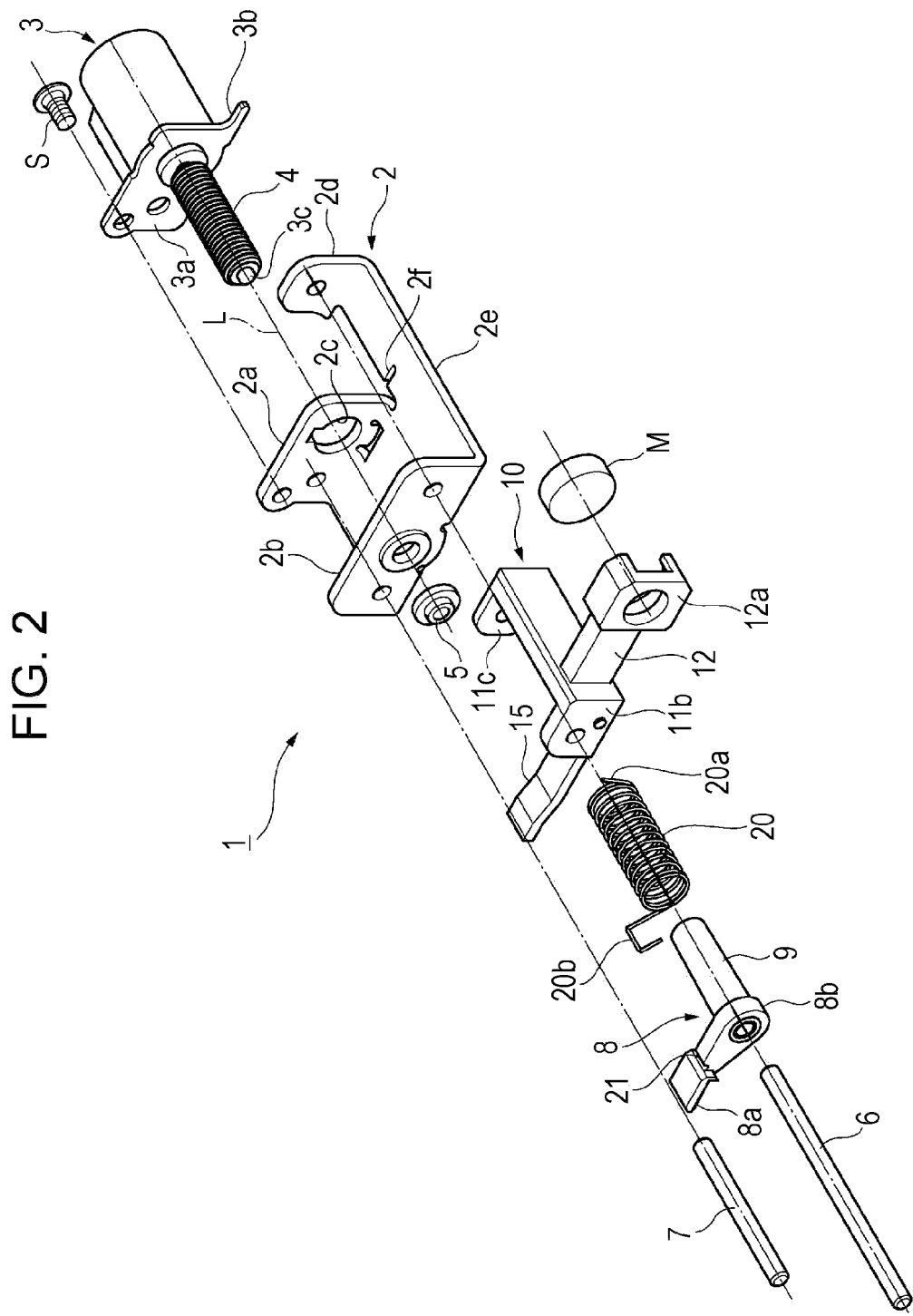
FIG. 2 is an exploded perspective view of the lens driving device.
Figure 3:
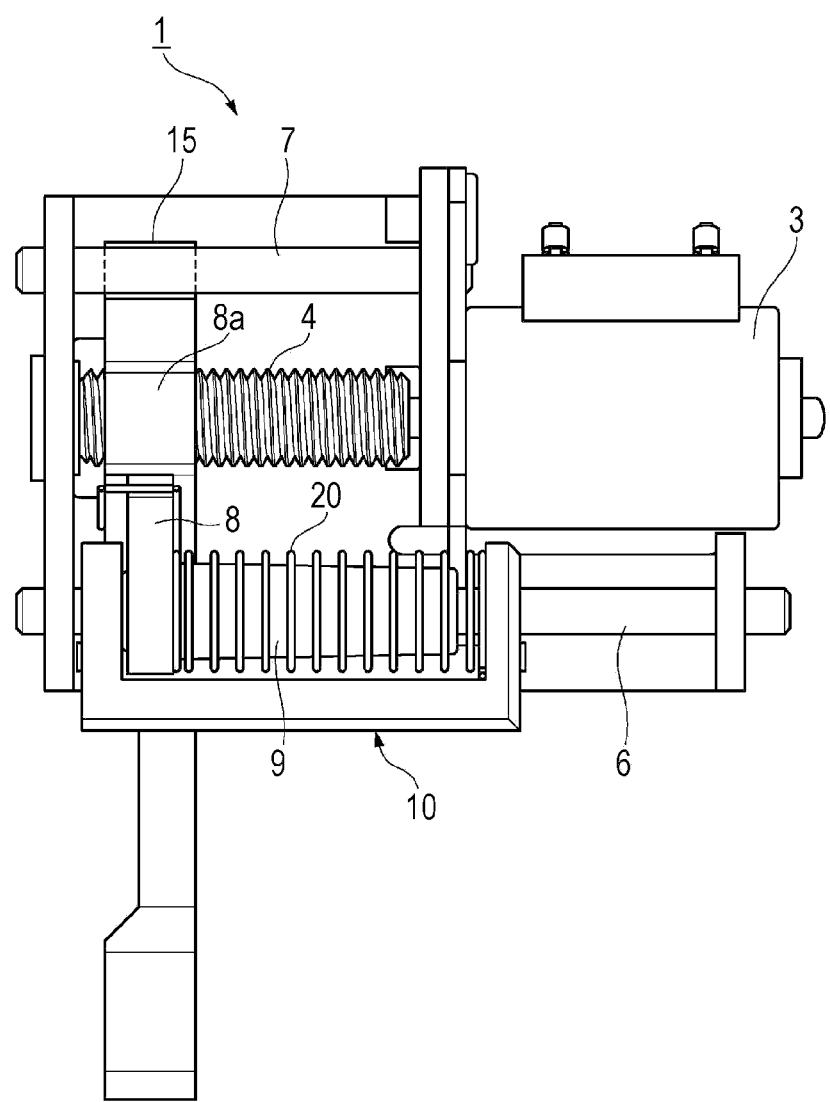
FIG. 3 is a plan view of the lens driving device.
Figure 4:
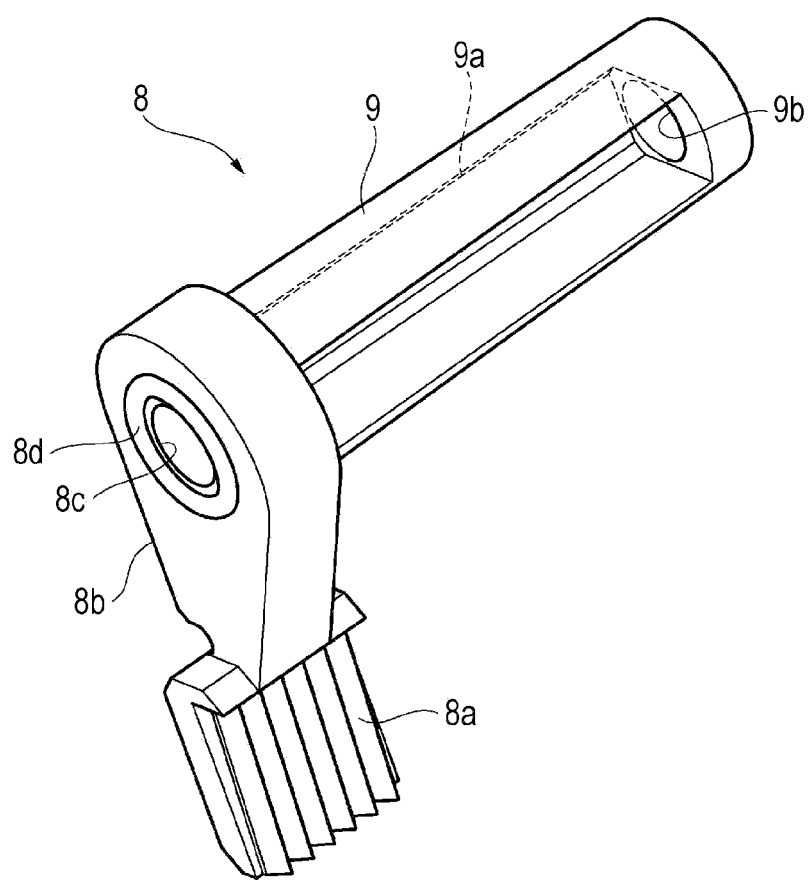
FIG. 4 is a perspective view of a movable member.
Figure 5:
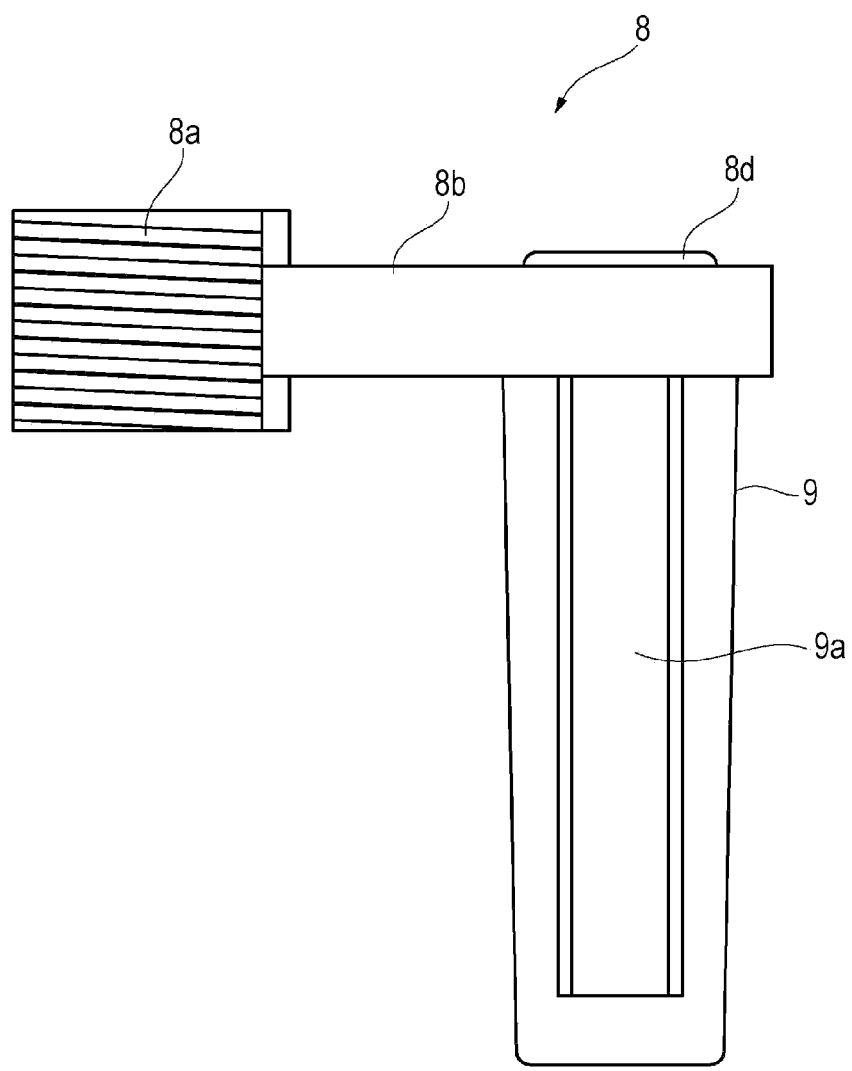
FIG. 5 is a bottom view of the movable member.
Figure 6:
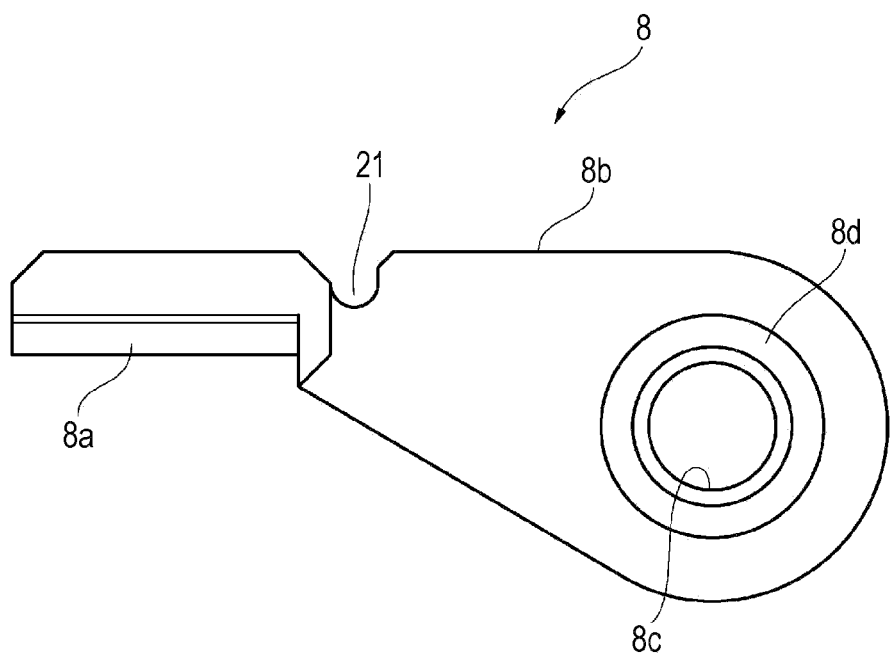
FIG. 6 is a side view of the movable member.
Figure 7:
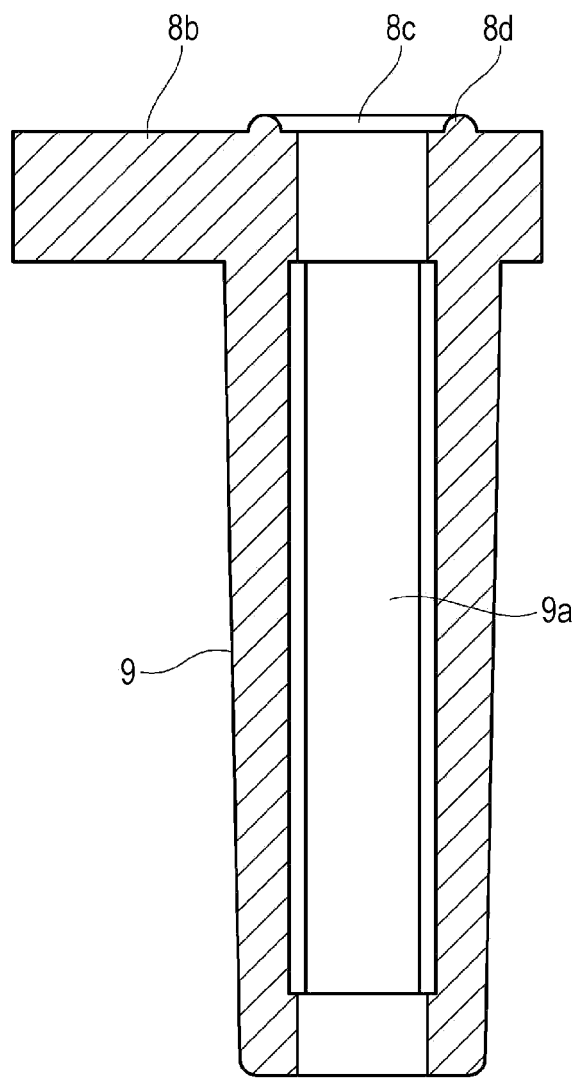
FIG. 7 is a longitudinal sectional view of the movable member.

FIGS. 1 to 3 illustrate a lens driving device 1 that is mounted in an optical pickup mechanism (optical unit) and that is used to correct spherical aberration of a lens. The lens driving device 1 includes a base member 2 having an angular U-shape. Various components, which will be described below, are attached to the base member 2 in order to unitize the components.

An L-shaped piece 3b, which protrudes downward from a bracket 3a of a stepping motor 3, is inserted into a cutout 2f formed in a bottom plate 2e of the base member 2. The bracket 3a is pressed against a rear frame portion 2a of the base member 2, and the bracket 3a is fixed to the rear frame portion 2a with a screw S. With such a structure, displacement of the motor 3 in the optical axis direction is prevented, and the motor 3 can be easily attached to the base member 2. Alternatively, the bracket 3a may be omitted, and the stepping motor 3 may be directly fixed to the base member 2.

A lead screw 4 is fixed to the rotary shaft 3c of the motor 3 by press-fitting the lead screw 4 onto the rotary shaft 3c, or the lead screw 4 is integrally formed with the rotary shaft 3c. The lead screw 4 is inserted into an opening 2c formed in the rear frame portion 2a of the base member 2. An end of the rotary shaft 3c, which protrudes from the lead screw 4, is rotatably supported by a bearing 5 that is fixed to a front frame portion 2b of the base member 2.

Both ends of a guide shaft 6 are fixed to the base member 2 such that the guide shaft 6 extends parallel to a rotation axis L of the lead screw 4 between a rear frame portion 2d and the front frame portion 2b of the base member 2. Both ends of an anti-rotation shaft 7 are fixed to the base member 2 such that the anti-rotation shaft 7 extends parallel to the guide shaft 6 between the rear frame portion 2a and the front frame portion 2b of the base member 2.

As illustrated in FIGS. 2 and 4 to 7, a rack gear portion 8a, which is an example of a gear portion, meshes with the lead screw 4. The guide shaft 6 extends through a base end portion 8b of the movable member 8 having the rack gear portion 8a. The movable member 8 rotates around the guide shaft 6, and the base end portion 8b is guided linearly along the guide shaft 6. A rod portion 9, which extends along the rotation axis L, is integrally formed with the base end portion 8b. A slit 9a having a rectangular cross-section is formed in the rod portion 9, and the guide shaft 6 is inserted through the slit 9a.

The movable member 8 is rotatable around the guide shaft 6, which is inserted through a shaft hole 8c that is formed in the base end portion 8b and a shaft hole 9b that is formed in the rod portion 9. Wall surfaces of the slit 9a having a rectangular cross-section are in contact with the peripheral surface of the guide shaft 6, whereby the movable member 8 can be smoothly guided along the guide shaft 6. Due to the rod portion 9, the rack gear portion 8a is prevented from being inclined relative to the rotation axis L, whereby the rack gear portion 8a can always mesh with the lead screw 4 stably.

Figure 8:
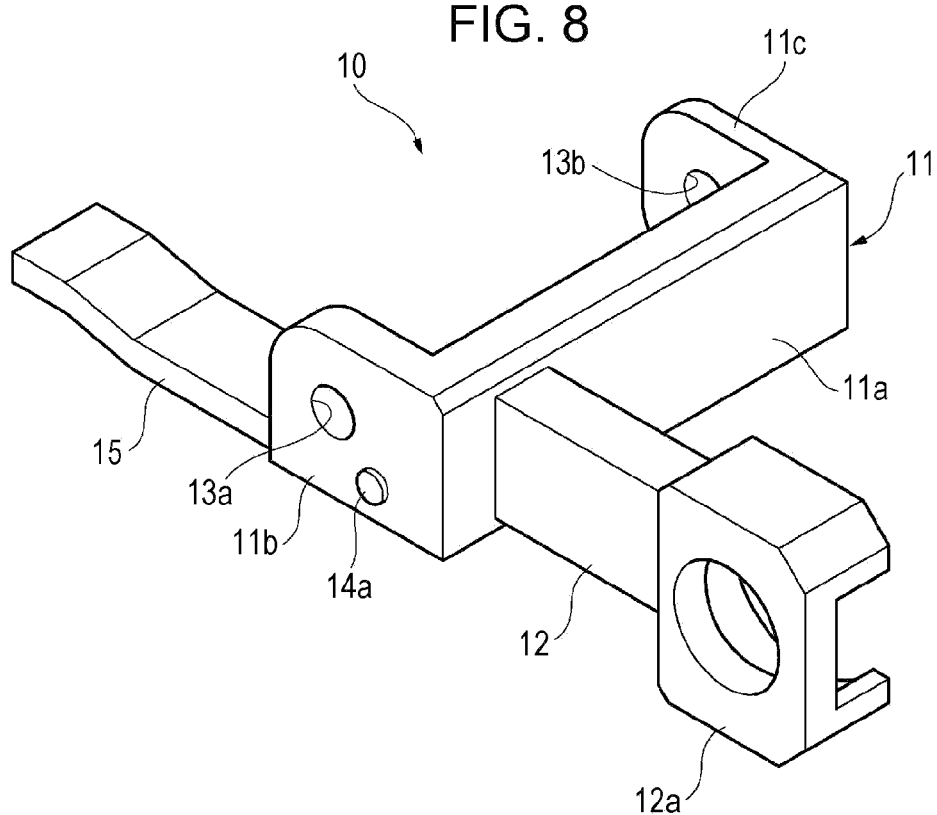
FIG. 8 is a perspective view of a lens holder.
Figure 9:
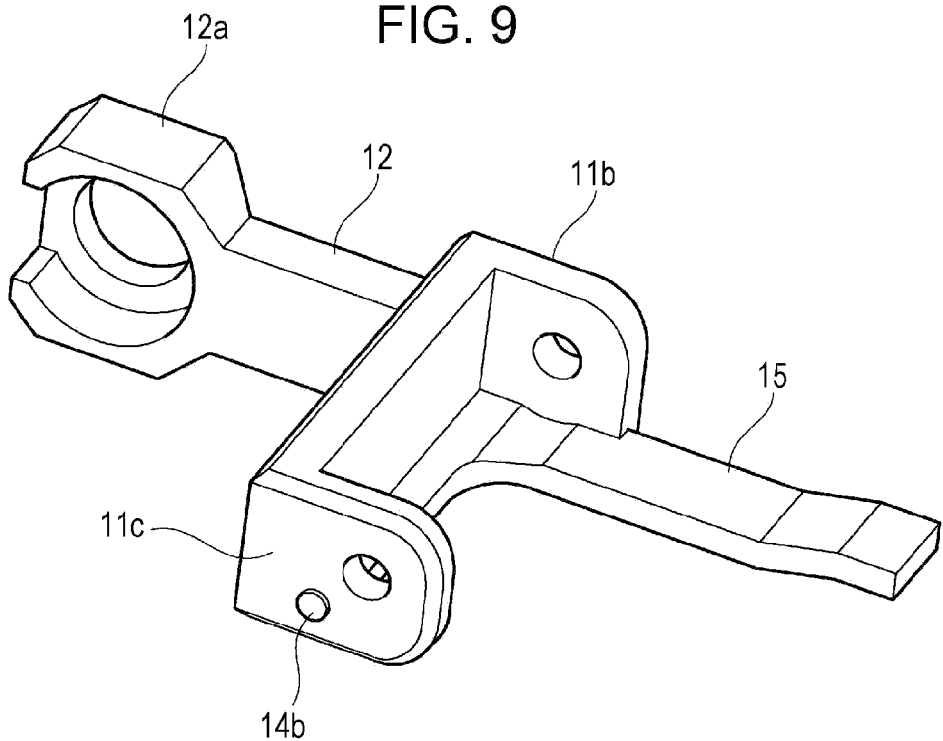
FIG. 9 is a perspective view of the lens holder.

As illustrated in FIGS. 2, 8, and 9, a lens holder 10, to which a lens M is fixed, includes a spring supporting frame 11 having an angular U-shape. A lens supporting arm 12 protrudes from a side of the spring supporting frame 11 (in a direction perpendicular to the rotation axis L). A lens frame 12a is disposed at a free end of the lens supporting arm 12. An anti-rotation piece 15 protrudes (in a direction perpendicular to the rotation axis L) from a side of the spring supporting frame 11 opposite to the side on which the lens supporting arm 12 is disposed.

The spring supporting frame 11 includes a connection portion 11a, a first portion 11b, and a second portion 11c. The connection portion 11a extends parallel to the rotation axis L. The first portion 11b protrudes from one end of the connection portion 11a in a direction perpendicular to the rotation axis L. The second portion 11c protrudes from the other end of the connection portion 11a in a direction parallel to the first portion 11b. A guide hole 13a, into which the guide shaft 6 is inserted, is formed in the first portion 11b. A guide hole 13b, into which the guide shaft 6 is inserted, is formed in the second portion 11c. Due to the guide holes 13a and 13b, the lens holder 10 is smoothly guided along the guide shaft 6. A stopper portion 14a, which contacts the front frame portion 2b, protrudes from the first portion 11b. A stopper portion 14b, which contacts the rear frame portion 2d, protrudes from the second portion 11c.

Figure 10:
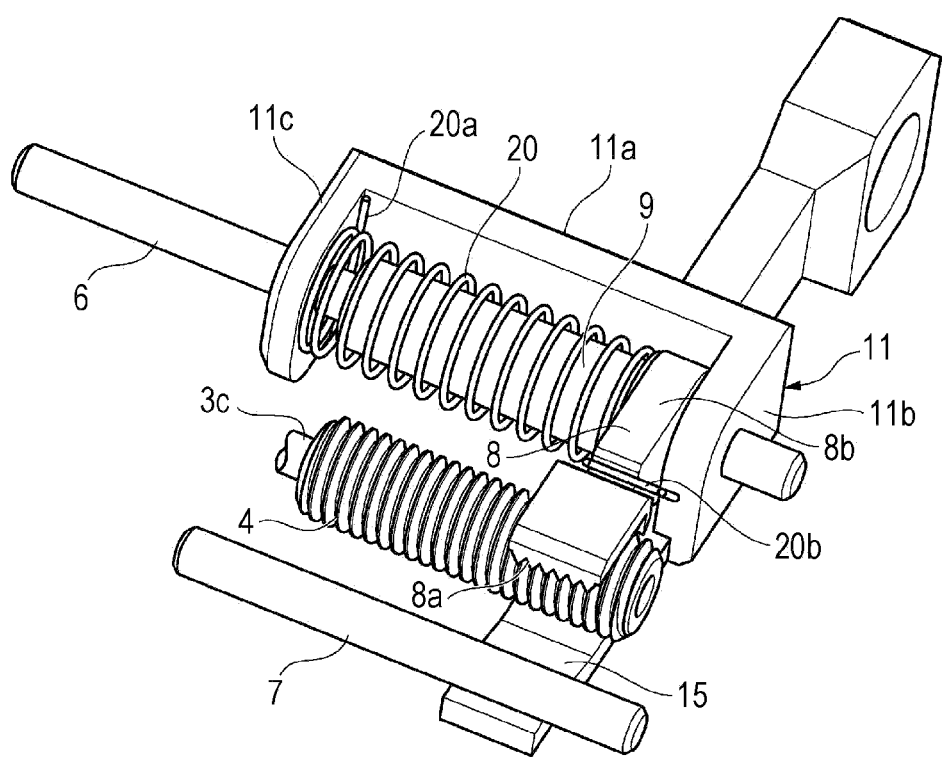
FIG. 10 is a perspective view of the main part of the lens driving device.
Figure 11:
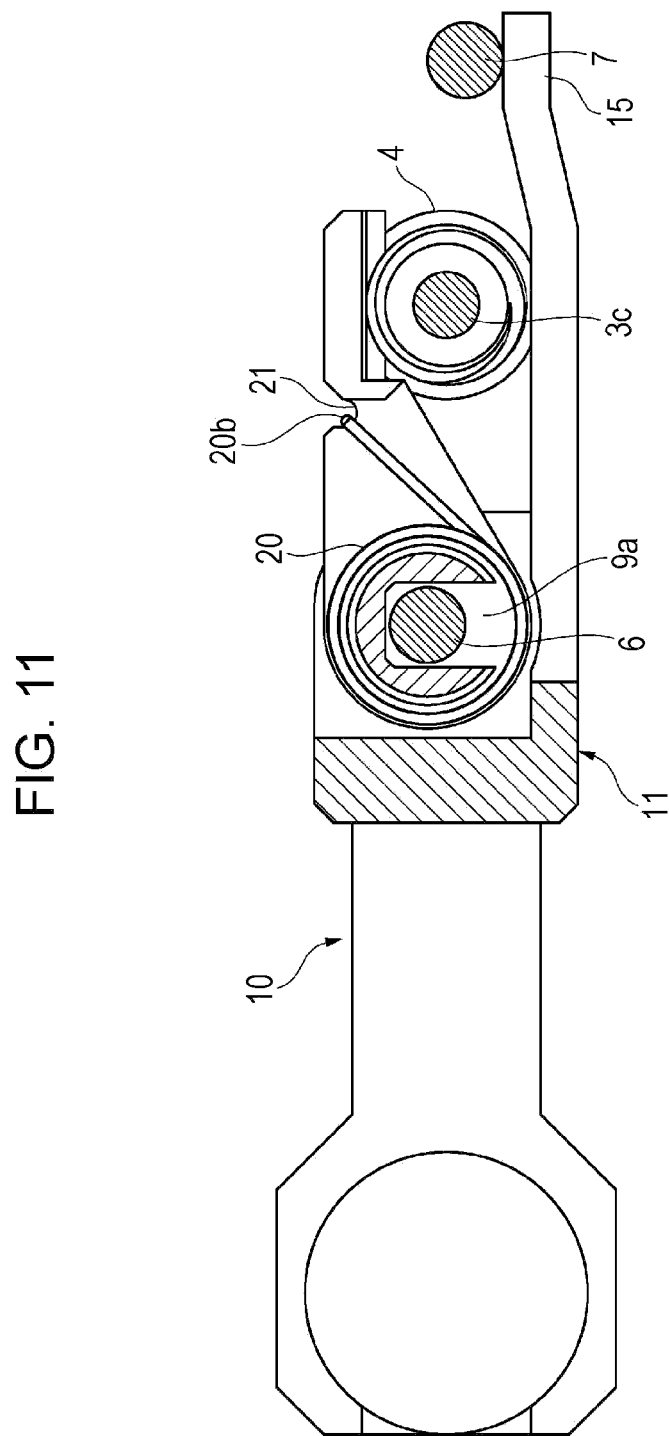
FIG. 11 is a sectional view of the main part of the lens driving device illustrated in FIG. 10.

As illustrated in FIGS. 10 and 11, the base end portion 8b of the movable member 8 is disposed between the first portion 11b and the second portion 11c of the spring supporting frame 11. A friction reducing portion 8d (see FIG. 4) is formed on the base end portion 8b so as to surround the shaft hole 8c. The friction reducing portion 8d, which has a ring shape having a semicircular cross-section, is in contact with the first portion 11b. Due to the friction reducing portion 8d, the rack gear portion 8a of the movable member 8 can be smoothly disengaged from the terminal end of the lead screw 4 if the motor 3 becomes uncontrollable.

In order to maintain the contact state, a compression coil spring 20 is disposed between the second portion 11c and the base end portion 8b of the movable member 8. The compression coil spring 20 is wound around the rod portion 9, through which the guide shaft 6 extends. A first end 20a of the compression coil spring 20 is held by the connection portion 11a of the spring supporting frame 11 and immobilized. A second end 20b of the compression coil spring 20, which has an angular U-shape, is hooked into and held by a groove 21, which is formed in a part of the base end portion 8b of the movable member 8 near the rack gear portion 8a, and immobilized.

Figure 12:
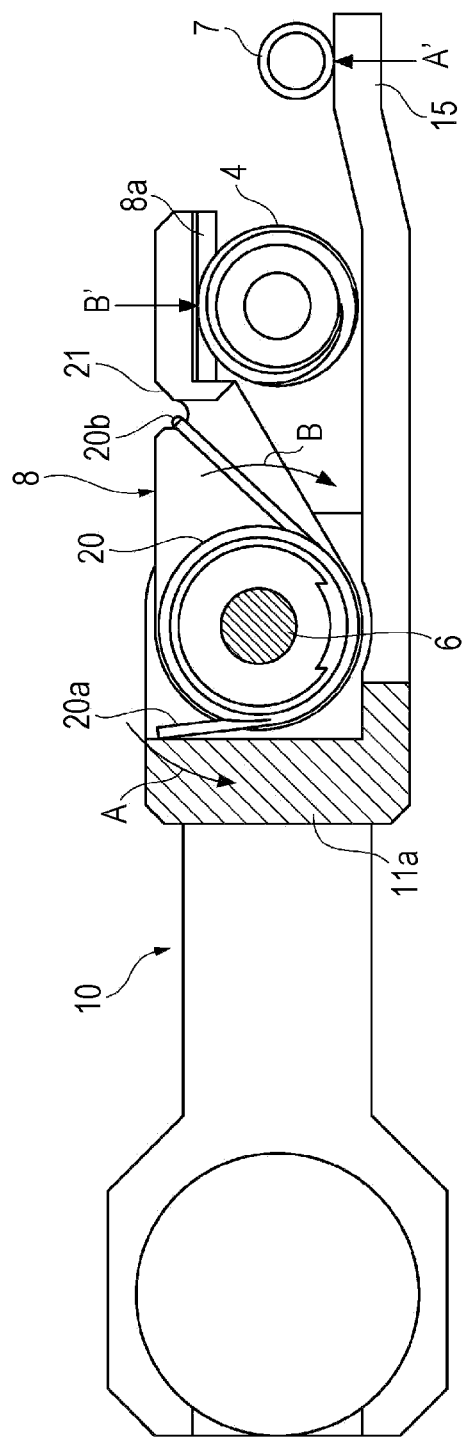
FIG. 12 is a sectional view of the main part of the lens driving device illustrated in FIG. 10.

As illustrated in FIG. 12, the first end 20a of the compression coil spring 20 applies an urging force to the connection portion 11a of the spring supporting frame 11 and presses the connection portion 11a in the direction of arrow A. Thus, the anti-rotation piece 15, which rotates around the guide shaft 6, is pressed against the anti-rotation shaft 7 (as indicated by arrow A'), whereby rotation of the lens holder 10 is prevented. Moreover, the second end 20b of the compression coil spring 20 applies an urging force and presses the movable member 8 in the direction of arrow B. Thus, the rack gear portion 8a of the movable member 8, which is rotatable around the guide shaft 6, is pressed against the lead screw 4 (as indicated by arrow B'), whereby the rack gear portion 8a can securely mesh with the lead screw 4.

Thus, the compression coil spring 20 is used to press the rack gear portion 8a against the lead screw 4. Therefore, occurrence of backlash between the lead screw 4 and the rack gear portion 8a of the movable member 8, which reciprocates together with the lens holder 10 by being driven by the motor 3, is prevented.

In existing lens driving devices, an ordinary female threaded nut is used as the gear portion. In this case, if the motor becomes uncontrollable for some reason and the lead screw continues rotating, the lead screw may bite into the female threaded nut at the terminal end of the lead screw and thereby the female threaded nut or the lead screw may be completely broken. Moreover, it is necessary that the threads of the lead screw and the female threaded nut be formed with high precision for the purpose of noise reduction.

To solve such problems, in the lens driving device 1, the rack gear portion 8a is used as the gear portion so that the gear portion can be disengaged from the terminal end of the lead screw 4 in the radial direction. To efficiently utilize the guide shaft 6 formed with high precision, the guide shaft 6 extends through the spring supporting frame 11 of the lens holder 10 holding the lens M and the movable member 8 including the rack gear portion 8a that meshes with the lead screw 4. Thus, the movable member 8 and the lens holder 10 are linearly guided along the guide shaft 6, and the guide shaft 6 can be also used as the rotation shaft of the movable member 8.

The compression coil spring 20 is wound around the guide shaft 6, and the rack gear portion 8a is pressed against the lead screw 4 by using the compression coil spring 20. With such a structure, advantages are obtained in that the lead screw 4 and the guide shaft 6 can be disposed close to each other when the rack gear portion 8a is used, and thereby the size of the lens driving device 1 is reduced; and the number of springs is reduced and thereby the structure of the lens driving device 1 can be simplified. Rotation of the lens holder 10 can be prevented by using the compression coil spring 20, which serves to press the rack gear portion 8a against the lead screw 4 and to press the movable member 8 against the spring supporting frame 11. The lens driving device 1 can be assembled easily because it is sufficient that the anti-rotation piece 15 be simply brought into contact with the anti-rotation shaft 7.

Figure 13:
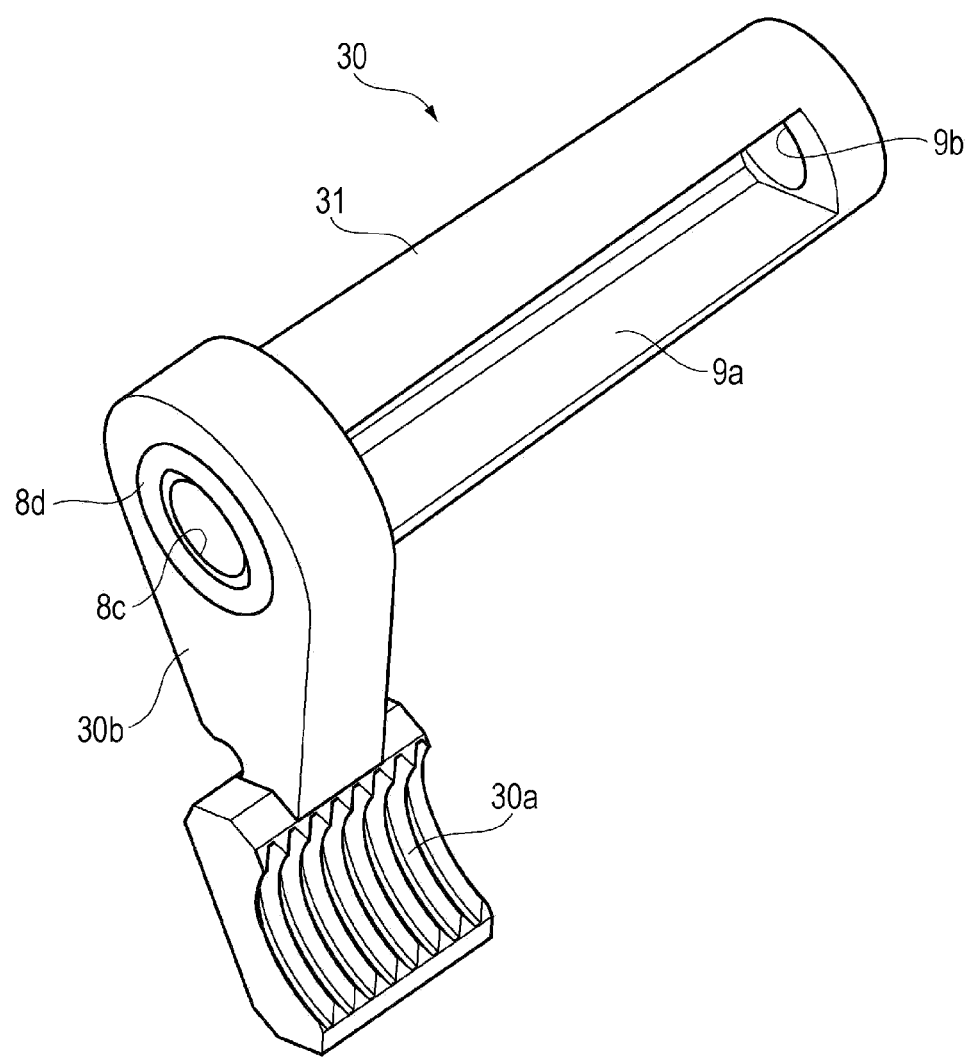
FIG. 13 is a perspective view of a movable member according to another embodiment.
Figure 14:
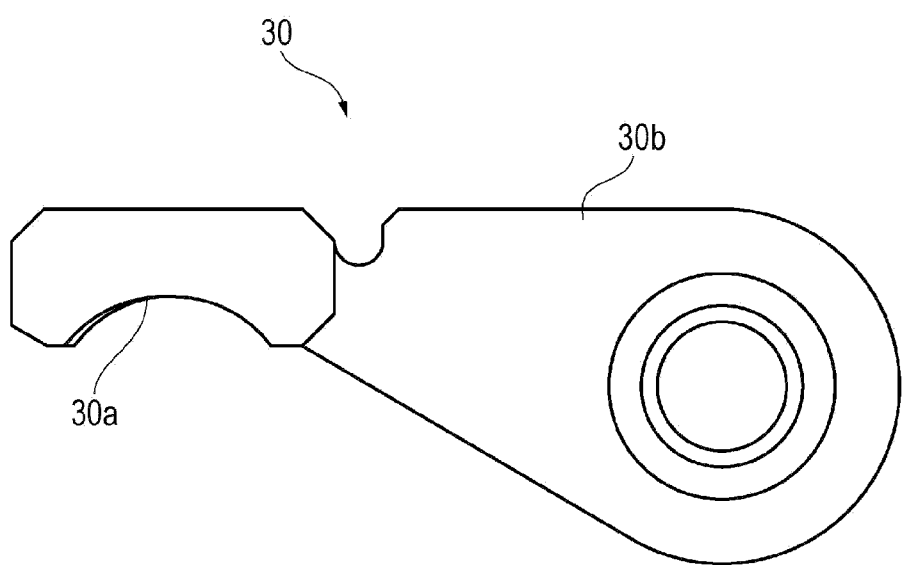
FIG. 14 is a side view of the movable member illustrated in FIG. 13.

The present invention is not limited to the embodiment described above. For example, FIGS. 13 and 14 illustrate a movable member 30 that is different from that of the embodiment described above. A half nut portion 30a is used as a gear portion, and a rod portion 31 is integrally formed with a base end portion 30b. Here, the half nut portion 30a is a portion having threads each having a length equal to or smaller than half the entire circumference.

It is preferable that the rack gear portion 8a and the half nut portion 30a each have three pitches or more in the direction of the rotation axis L so as to achieve secure meshing.

The friction reducing portion 8d formed on each of the base end portions 8b and 30b of the movable members 8 and 30 is not limited to a ring-shaped member, and may have a shape including hemispherical bodies that are arranged at a regular pitch.

What is claimed is:

1. A lens driving device mounted in an optical unit, the lens driving device comprising:
   a lead screw to be rotated by a motor;
   a movable member including a gear portion that is a rack gear portion or a half nut portion that meshes with the lead screw;
   a lens holder configured to reciprocate along a rotation axis of the lead screw as the lead screw rotates, the lens holder including a spring supporting frame;
   a guide shaft that extends parallel to the rotation axis, the guide shaft extending through the movable member and the spring supporting frame; and
   a coil spring that is wound around the guide shaft and disposed in the spring supporting frame, the coil spring having a first end abutting against the lens holder and a second end abutting against the movable member, the coil spring pressing the gear portion against the lead screw with an urging force thereof applied to the gear portion through the second end,
   wherein the guide shaft guides both of the lens holder and the movable member to reciprocate along the rotation axis, and guides the movable member to rotate therearound.

2. The lens driving device according to claim 1,
   wherein the guide shaft passes through a first portion of the spring supporting frame, a second portion of the spring supporting frame facing the first portion, and the movable member,
   wherein the movable member is disposed between the first portion and the second portion such that the movable member is in contact with the first portion,
   wherein the coil spring is a compression coil spring, and
   wherein the compression coil spring is disposed in the spring supporting frame at a position between the movable member and the second portion, the first end of the compression coil spring abutting against the spring supporting frame, and the second end of the compression coil spring abutting against the movable member.

3. The lens driving device according to claim 2, further comprising:
   an anti-rotation shaft that extends parallel to the guide shaft,
   wherein the lens holder includes:
      an anti-rotation piece that protrudes perpendicular to the rotation axis of the lead screw, the anti-rotation piece being pressed against the anti-rotation shaft by an urging force of the compression coil spring applied to the anti-rotation piece through the first end of the compression coil spring abutting against the spring supporting frame.

4. The lens driving device according to claim 1, further comprising:
   an anti-rotation shaft that extends parallel to the guide shaft,
   wherein the lens holder includes:

an anti-rotation piece that protrudes perpendicular to the rotation axis of the lead screw, the anti-rotation piece being pressed against the anti-rotation shaft by an urging force of the coil spring applied to the anti-rotation piece through the first end of the coil spring abutting against the spring supporting frame.

5. The lens driving device according to claim 1, wherein the lens holder and the movable member rotate around the guide shaft in a first direction and a second direction opposite to the first direction, respectively, by respective urging forces applied thereto from the coil spring.

6. The lens driving device according to claim 1,
wherein the spring supporting frame of the lens holder includes:
a first portion;
a second portion facing the first portion; and
a connection portion connecting the first portion and the second portion,
wherein the movable member further includes a base end portion, the movable member being disposed between the first portion and the second portion such that the base end portion is in contact with the first portion,
and wherein the guide shaft passing through the first portion, the base end portion, and the second portion.

7. The lens driving device according to claim 6,
wherein the coil spring is disposed in the spring supporting frame between the base end portion and the second portion, the first end of the coil spring abutting against the second portion, and the second end of the compression coil spring abutting against the base end portion.

8. The lens driving device according to claim 6,
wherein the movable member further includes a rod portion in which the guide shaft passes, the coil spring winding around the rod portion.

* * * * *